(12) United States Patent
Fillmore

(10) Patent No.: US 7,041,246 B2
(45) Date of Patent: May 9, 2006

(54) METHOD OF MAKING A DISPENSING CLOSURE

(75) Inventor: William E. Fillmore, Toledo, OH (US)

(73) Assignee: Owens-Illinois Closure Inc., Toledo, OH (US)

( * ) Notice: Subject to any disclaimer, the term of this patent is extended or adjusted under 35 U.S.C. 154(b) by 0 days.

(21) Appl. No.: 10/648,979

(22) Filed: Aug. 27, 2003

(65) Prior Publication Data

US 2004/0036195 A1    Feb. 26, 2004

Related U.S. Application Data

(62) Division of application No. 09/152,925, filed on Sep. 14, 1998, now Pat. No. 6,673,295, which is a division of application No. 08/746,521, filed on Nov. 12, 1996, now Pat. No. 5,927,567.

(51) Int. Cl.
*B29C 43/20* (2006.01)

(52) U.S. Cl. ............... 264/154; 264/250; 264/255; 264/268

(58) Field of Classification Search ........... 264/268, 264/255, 250, 154
See application file for complete search history.

(56) References Cited

U.S. PATENT DOCUMENTS

| | | | |
|---|---|---|---|
| 1,206,661 A | 11/1916 | Booth | |
| 1,989,714 A | 2/1935 | Statham | |
| 2,175,052 A | 10/1939 | Bull et al. | |
| 2,646,063 A | 7/1953 | Hayes | |
| 2,684,789 A | 7/1954 | Marchant | |
| 2,733,843 A | 2/1956 | Scroko | |
| 2,785,841 A | 3/1957 | Westgate | |
| 3,276,115 A | 10/1966 | Hansz | |
| 3,281,000 A | 10/1966 | Lowen | |
| 3,283,481 A | 11/1966 | Studley et al. | |
| 3,289,874 A | 12/1966 | Dailey et al. | |
| 3,342,379 A | 9/1967 | Foley | |
| 3,490,488 A | 1/1970 | Grist | |
| 3,613,223 A | 10/1971 | Bush | |
| 3,618,825 A | 11/1971 | Clarke | |
| 3,669,323 A | 6/1972 | Harker et al. | |
| 3,762,170 A | 10/1973 | Fitzhugh | |
| 3,927,796 A | 12/1975 | Whitehouse | |
| 4,133,457 A | 1/1979 | Klassen | |
| 4,166,553 A | 9/1979 | Fraterrigo | |
| 4,171,561 A | 10/1979 | Bainard et al. | |
| 4,224,275 A | 9/1980 | Sauer | |
| 4,230,230 A | 10/1980 | Mumford | |
| 4,312,824 A | 1/1982 | Mori et al. | |

(Continued)

FOREIGN PATENT DOCUMENTS

DE    2704164    8/1978

(Continued)

*Primary Examiner*—Edmund H. Lee

(57) ABSTRACT

A dispensing closure including a compression molded plastic closure having a base wall and a peripheral skirt having threads for engaging a container. An opening is formed in the base wall and a compression molded liner is molded in situ in the closure and includes a radial liner forming portion on the inner surface of the base wall of the closure. An integral nozzle is compression molded with the liner and extends axially through the opening in the base wall. One or more slits in the nozzle define a dispensing opening through which the contents of the container can be dispensed by squeezing the container. In another form, the dispensing closure is provided with a liner such that a syringe needle is used to penetrate an elastomeric wall for removal of the liquid contents of the package.

28 Claims, 5 Drawing Sheets

U.S. PATENT DOCUMENTS

| | | | |
|---|---|---|---|
| 4,314,658 A | 2/1982 | Laauwe | |
| 4,334,638 A | 6/1982 | Stock | |
| 4,343,754 A * | 8/1982 | Wilde et al. | 264/154 |
| 4,406,847 A | 9/1983 | O'Neal et al. | |
| 4,408,702 A | 10/1983 | Horvath | |
| 4,421,705 A | 12/1983 | Hatakeyama et al. | |
| 4,434,810 A | 3/1984 | Atkinson | |
| 4,470,523 A | 9/1984 | Spector | |
| 4,728,006 A | 3/1988 | Drobish et al. | |
| 4,749,108 A | 6/1988 | Dornsbusch et al. | |
| 4,830,205 A | 5/1989 | Hammond et al. | |
| 4,851,176 A | 7/1989 | Christiansen et al. | |
| 4,867,926 A | 9/1989 | Matsushima | |
| 4,969,581 A | 11/1990 | Seifert et al. | |
| 4,987,740 A | 1/1991 | Coleman | |
| 4,991,745 A | 2/1991 | Brown | |
| 5,005,737 A | 4/1991 | Rohr | |
| 5,012,956 A | 5/1991 | Stoody | |
| 5,033,647 A | 7/1991 | Smith | |
| 5,033,655 A * | 7/1991 | Brown | 222/212 |
| 5,071,017 A | 12/1991 | Stull | |
| 5,105,985 A | 4/1992 | Kroeber | |
| 5,115,950 A | 5/1992 | Rohr | |
| 5,213,236 A | 5/1993 | Brown et al. | |
| 5,234,138 A | 8/1993 | De Laforcade | |
| 5,261,459 A | 11/1993 | Atkinson et al. | |
| 5,271,531 A | 12/1993 | Rohr et al. | |
| 5,285,913 A * | 2/1994 | Morton | 215/349 |
| 5,307,955 A | 5/1994 | Viegas | |
| 5,325,999 A | 7/1994 | Gueret | |
| 5,339,995 A | 8/1994 | Brown et al. | |
| 5,360,145 A | 11/1994 | Gueret | |
| 5,377,877 A | 1/1995 | Brown et al. | |
| 5,390,805 A | 2/1995 | Bilaru et al. | |
| 5,409,144 A | 4/1995 | Brown | |
| 5,531,363 A | 7/1996 | Gross et al. | |
| 5,743,443 A * | 4/1998 | Hins | 222/490 |
| 5,800,764 A * | 9/1998 | Smeyak et al. | 264/268 |
| 5,927,567 A | 7/1999 | Fillmore | |
| 6,230,940 B1 * | 5/2001 | Manning et al. | 222/185.1 |
| 6,786,363 B1 * | 9/2004 | Lohrman | 222/213 |

FOREIGN PATENT DOCUMENTS

| | | |
|---|---|---|
| DE | 3531783 A | 3/1987 |
| DE | 9307083 U1 | 9/1993 |
| DE | 4315697 C1 | 7/1994 |
| DE | 29508151 U1 | 8/1995 |
| DE | 19533184 A1 | 9/1995 |
| DE | 29508949 U1 | 9/1995 |
| DE | 4417569 A1 | 1/1996 |
| DE | 4440211 C1 | 2/1996 |
| DE | 29603364 U1 | 5/1996 |
| DE | 19633472 A1 | 3/1997 |
| EP | 501365 A1 | 9/1962 |
| EP | 209223 A1 | 2/1986 |
| EP | 219931 | 8/1987 |
| EP | 232571 | 8/1987 |
| EP | 242253 A | 10/1987 |
| EP | 253495 | 1/1988 |
| EP | 257880 A1 | 3/1988 |
| EP | 275836 A1 | 7/1988 |
| EP | 287530 A2 | 10/1988 |
| EP | 263772 A1 | 12/1988 |
| EP | 380204 A1 | 8/1990 |
| EP | 395380 A2 | 10/1990 |
| EP | 405472 A1 | 1/1991 |
| EP | 442379 | 8/1991 |
| EP | 442857 A1 | 8/1991 |
| EP | 452260 A1 | 10/1991 |
| EP | 455431 A1 | 11/1991 |
| EP | 463658 A1 | 1/1992 |
| EP | 495435 A1 | 7/1992 |
| EP | 495440 A2 | 7/1992 |
| EP | 281529 B1 | 5/1993 |
| EP | 546817 A1 | 6/1993 |
| EP | 0545678 A2 | 9/1993 |
| EP | 0743259 A1 | 11/1996 |
| FR | 2690139 | 10/1993 |
| GB | 2166121 A | 4/1986 |
| GB | 2208290 A | 3/1989 |
| GB | 2260535 A | 4/1993 |
| GB | 2252734 A | 8/1993 |
| GB | 2297959 A | 8/1996 |
| WO | 599 | 1/1987 |
| WO | 4244 | 3/1992 |
| WO | 3858 | 3/1993 |
| WO | 13992 | 7/1993 |
| WO | 5552 | 3/1994 |
| WO | 13546 | 6/1994 |
| WO | 14675 | 7/1994 |
| WO | 17712 | 8/1994 |
| WO | 21098 | 8/1995 |
| WO | 34500 | 12/1995 |
| WO | 01215 | 1/1996 |

* cited by examiner

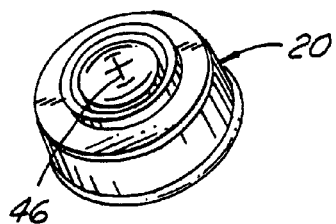
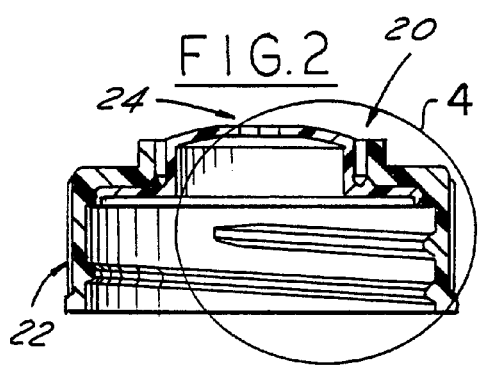
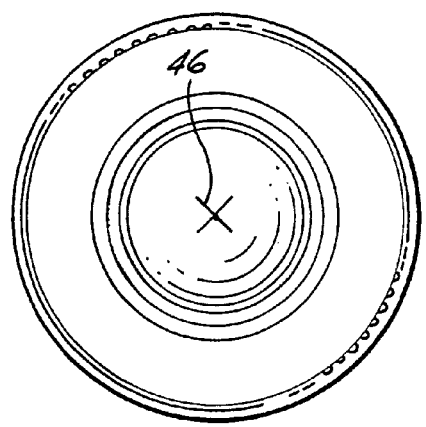
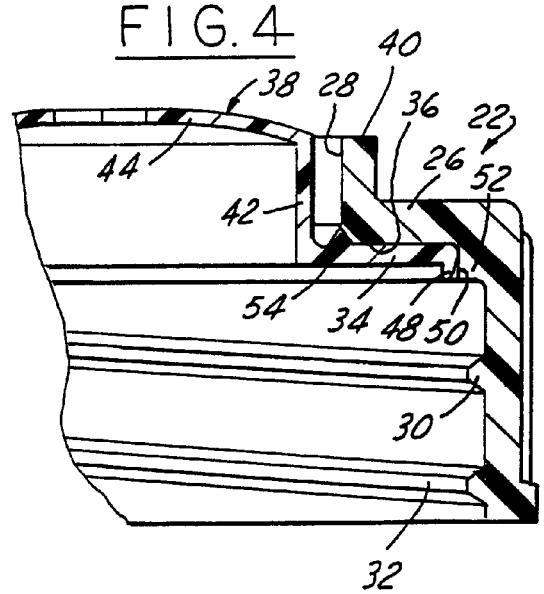

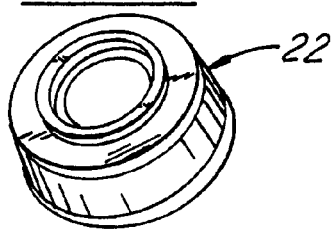
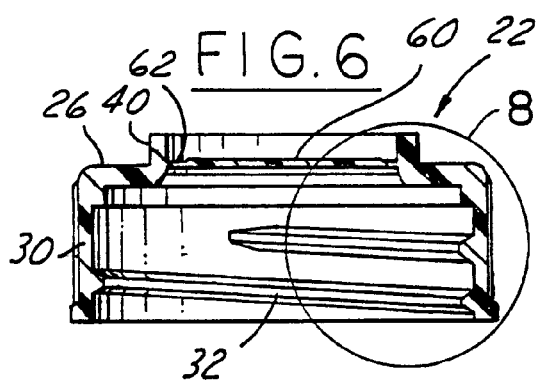
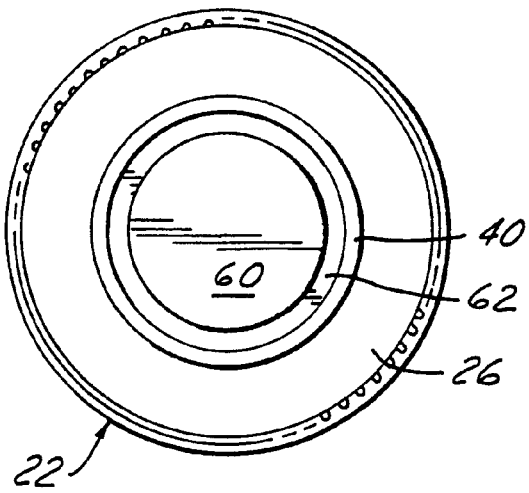
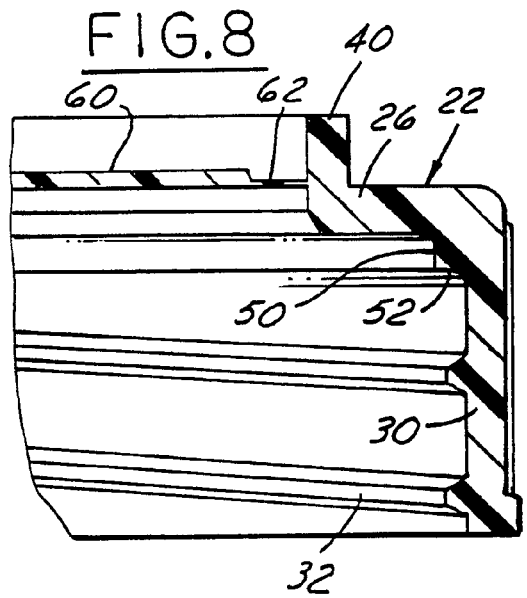

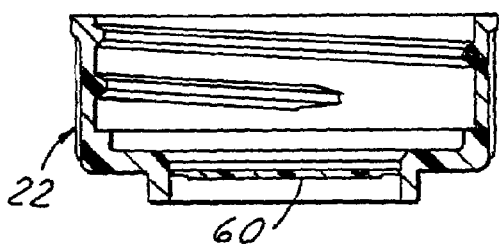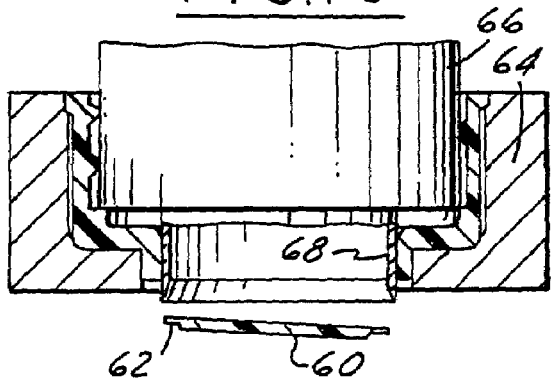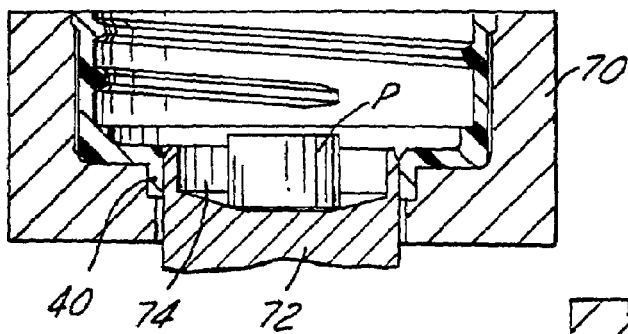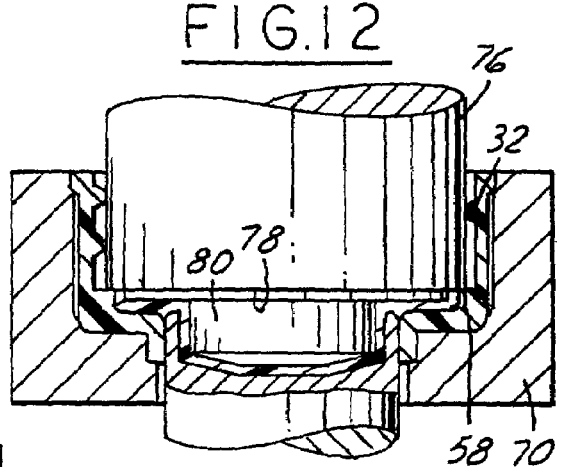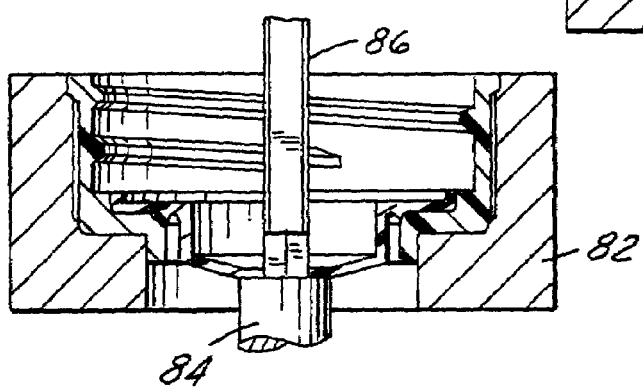

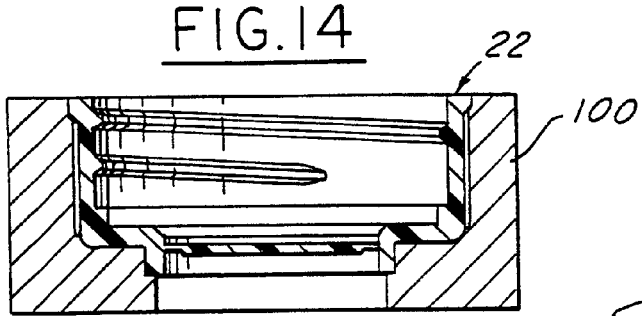
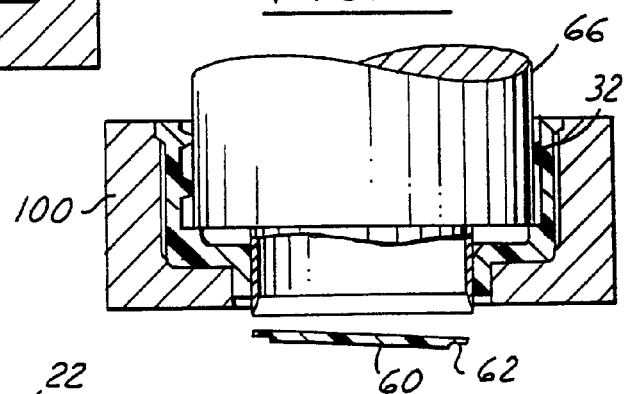
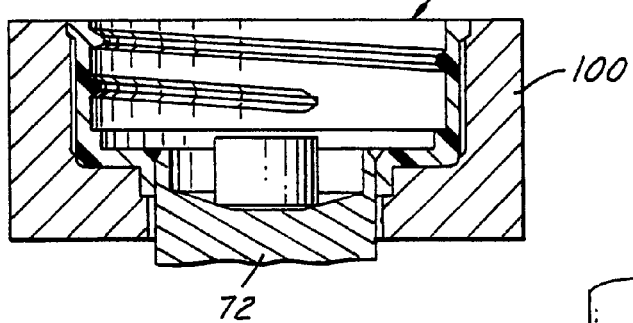
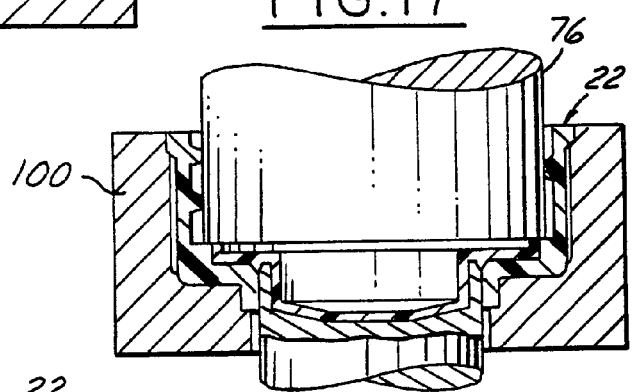
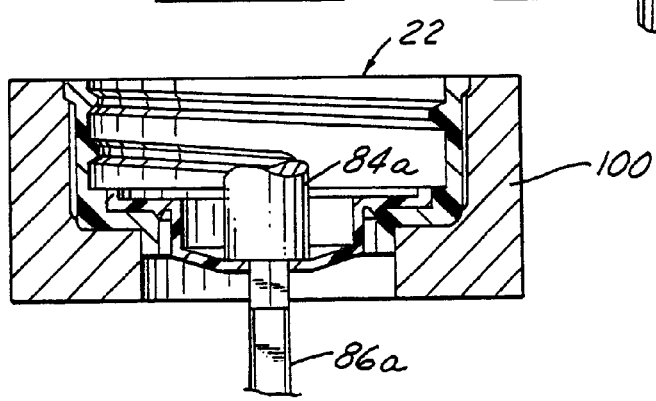

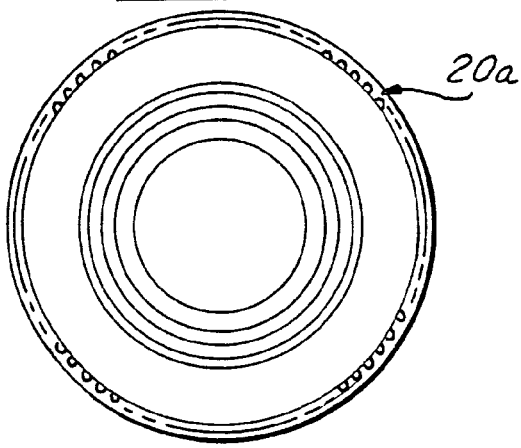
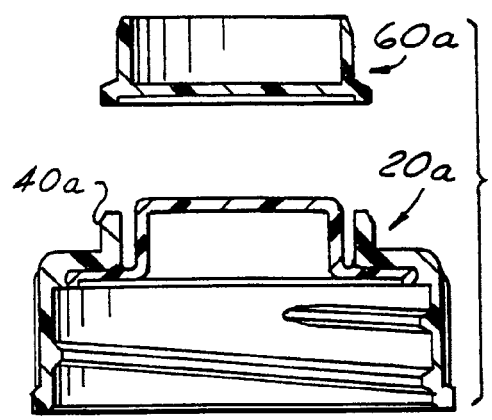
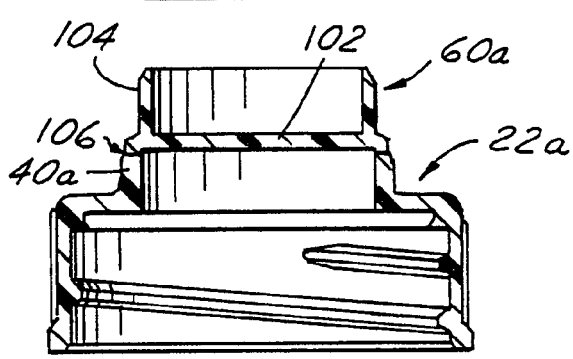
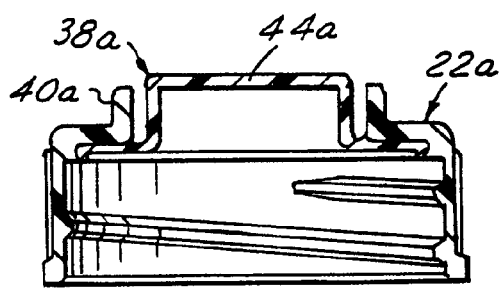
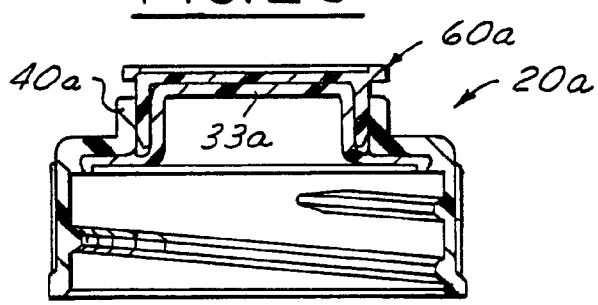
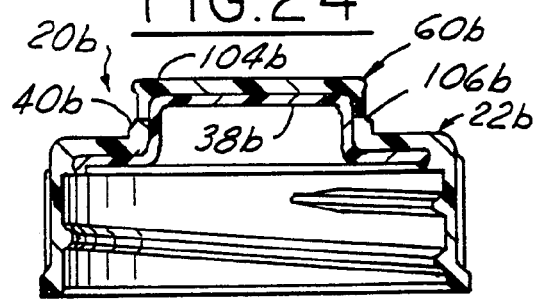

METHOD OF MAKING A DISPENSING CLOSURE

This application is a division of application Ser. No. 09/152,925 filed Sep. 14, 1998, now U.S. Pat. No. 6,673,295 which is a division of application Ser. No. 08/746,521 filed Nov. 12, 1996 and now U.S. Pat. No. 5,927,567.

This invention relates to dispensing closures and a method of making such closures.

BACKGROUND AND SUMMARY OF THE INVENTION

In dispensing closures, it is common to form a closure with an opening and insert a resilient nozzle in the closure. Such a closure requires the separate manufacture of each of these components as well as associated components for retaining the nozzle.

Among the objectives of the present invention are to provide a dispensing closure that requires only two components, namely, a closure and a combined liner and nozzle; which dispensing closure is made by compression molding a closure and thereafter compression molding a charge of plastic in the closure to form the combined closure, liner and nozzle; wherein the method involves a minimum number of steps; and wherein the control of the tolerances of the dispensing closure is made easier.

In accordance with the invention, the dispensing closure comprises a plastic closure having a base wall and a peripheral skirt is compression molded and has threads for engaging a container. A compression molded liner is formed in situ in the closure and includes a radial liner forming portion on the inner surface of the base wall of the closure. An integral nozzle is compression molded with the liner and extends axially through the opening in the base wall. One or more slits in the nozzle define a dispensing opening through which the contents of the container can be dispensed by squeezing the container. The invention is also applicable to making a closure for a package wherein a syringe needle is used to penetrate an elastomeric wall for removal of the liquid contents of the package.

BRIEF DESCRIPTION OF THE DRAWINGS

FIG. 1 is a perspective view of the dispensing closure embodying the invention.

FIG. 2 is a vertical sectional view of the dispensing closure.

FIG. 3 is a top plan view of the dispensing closure.

FIG. 4 is a fragmentary sectional view on an enlarged scale of the dispensing closure shown in FIG. 2.

FIG. 5 is a perspective view of the plastic closure portion of the dispensing closure.

FIG. 6 is a vertical sectional view of the plastic closure portion after it has been compression molded.

FIG. 7 is a top plan view of the plastic closure portion shown in FIG. 6.

FIG. 8 is a fragmentary sectional view on an enlarged scale of the plastic closure portion shown in FIG. 6.

FIG. 9 is an inverted view of the plastic closure portion after it has been compression molded.

FIG. 10 is a sectional view of an apparatus for trimming the cull formed in the plastic closure portion to form an opening through the plastic closure portion.

FIG. 11 is a sectional view of an apparatus for compression molding a charge of plastic in place in the plastic closure.

FIG. 12 is a sectional view of an apparatus for compression molding the charge in the plastic closure to define a combined liner and nozzle in the plastic closure.

FIG. 13 is a sectional view of an apparatus for slitting the nozzle to define a dispensing closure.

FIG. 14 is an inverted view of a closure in a holder.

FIG. 15 is a sectional view of a modified form of an apparatus for trimming the cull from a plastic closure portion shown in FIG. 14.

FIG. 16 is a sectional view of a modified apparatus for molding a charge of plastic in place in the plastic closure.

FIG. 17 is a sectional view of a modified apparatus for compression molding the charge shown in FIG. 16.

FIG. 18 is a sectional view of a modified form of apparatus for slitting the nozzle.

FIG. 19 is a sectional view of a modified form of closure before forming a liner therein.

FIG. 20 is a top plan view of the closure shown in FIG. 19.

FIG. 21 is a sectional exploded view of the closure after the top section is severed.

FIG. 22 is a sectional view of the closure with the liner compression molded in the closure.

FIG. 23 is a sectional view of the closure and liner shown in FIG. 22 with the top section inverted and positioned to form a cap over the liner.

FIG. 24 is a sectional view of a modified form of closure and liner which includes a removable top section.

DESCRIPTION OF THE PREFERRED EMBODIMENTS

Referring to FIGS. 1–4, in accordance with the invention, the dispensing closure 20 embodying the invention comprises a compression molded plastic closure 22 and a combined liner and nozzle 24 compression molded in place in the plastic closure 22. The plastic closure 22 comprises a base wall 26 having an opening 28 therein and an integral peripheral skirt 30. The skirt 30 includes means on the inner surface thereof for engaging complementary means on a squeezable plastic container, the means herein shown comprising threads 32. The plastic closure is made of plastic such as polypropylene. The combined liner and nozzle 24 is made of highly resilient elastomeric material.

The combined liner and nozzle comprises an annular liner portion 34 engaging the inner surface 36 of the base wall 26 of the plastic closure 22. The combined liner and nozzle 24 includes an integral nozzle portion 38 which extends axially through the opening 28 in spaced relation to a cylindrical annular axial portion 40 which defines the opening in the plastic closure 22. Nozzle portion 38 includes an integral axial wall 42 extending from the liner portion 34 and an integral convex dome portion 44 having one or more slits 46 therethrough which open upon squeezing the container on which the dispensing closure 20 is positioned. As shown in FIG. 4, the liner portion 34 preferably includes an integral peripheral axial portion 48 extending along a short cylindrical portion 50 on a shoulder 52 at the juncture of the base wall 26 and skirt 30. In addition, the liner portion 34 preferably includes an integral annular bead 54 on the upper surface thereof which engages a complementary surface at the juncture of the axial portion 40 and base wall 26.

In accordance with the invention, the dispensing closure is made by first compression molding the closure 22 and thereafter compression molding the combined liner and dispensing nozzle 24 in the closure 22. In order to simplify the method of manufacture, the plastic closure 22 is formed with an integral disk or cull 60 connected to the base wall 26 by a thin annular web 62 (FIGS. 5–8).

Referring to FIGS. 9 and 10, the disk 60 is removed by inverting the plastic closure 22 and placing it in a holder 64 which holds the plastic closure 22 in position for moving a cutting tool 66 having an annular cutting edge 68 for severing the disk 60 and web 62 from the remainder of the closure 22.

Referring to FIGS. 11 and 12, the plastic closure 22 is then placed in a holder 70 for receiving the closure 22 which includes a tool 72 extending into the axial portion 40 and defining a cavity 74 for receiving a charge of molten plastic P. A compression molding tool 76 is then moved axially into the apparatus 70 to compression mold the combined liner and nozzle 24. The periphery of the tool 76 engages the threads 32 on the closure 22 and the shoulder 52 to close the cavity 74. The end of the tool 76 is configured with an annular surface 78 for forming the liner portion and an axial portion 80 for forming the nozzle portion. Referring to FIG. 13, the dispensing closure is then placed in a holder 82 where a base tool 84 contacts the nozzle portion and a cutting tool 86 is moved axially to cut one or more slits 46 in the nozzle portion.

In a preferred mode, as shown in FIGS. 14–18, a single holder 100 is provided and after the closure 22 is compression molded, it is used as a holder for the compression molded closure in performing the successive steps of severing the disc, compression molding the combined liner and nozzle 24 in the closure and forming the slits 46. Preferably, the holder 100 is one of a plurality of holders moved in an endless path, as by mounting on rotating turret which is moved past adjacent successive stations including a disc severing station; compression molding station for forming the liner and nozzle and a slitting station.

The compression molding is preferably by the method and apparatus described in U.S. patent application Ser. No. 08/135,829 filed Oct. 14, 1993 (OI 16662), and Ser. No. 08/135,828 incorporated herein by reference filed Oct. 14, 1993 (OI 16647).

Referring to FIGS. 13 and 18, the tool 84 and cutting tool 86 can be reversed such that the cutting tool 86a is moved upwardly rather than downwardly and tool 84a is stationary.

In a modified form shown in FIGS. 19–23, the closure 22a is molded with top section 60a that comprises a base wall 102 and an integral wall 104 molded integrally with the cylindrical axial portion 40a. A weakened line 106 is formed and extends circumferentially at the juncture of the wall 102 and axial portion 40a. The top section 60a is severed from the closure 22a along weakened line 106 separating the wall 102 from axial wall portion 40a. The liner and nozzle 44a is compression molded as described above. The top section 60a can be inverted and used as a cap (FIG. 23) with the cylindrical wall 104 extending into the space between the axial wall portion 40a and the liner and the base wall 102 engaging the upper wall 44a of the liner 24a.

In the modified form shown in FIG. 24, the dispensing closure 20b includes a plastic closure 22b which has a shortened axial wall portion 40b connected by a weakened line 106b to the cylindrical wall 104b of the top section 60b, such that upon severing by the user, the top section 60b it can be used as a removable cap.

Although the invention has been described as being directed to making a dispensing closure, it is also applicable to making a closure for a package wherein a syringe needle is used to penetrate an elastomeric wall for removal of the liquid contents of the package.

It can thus be seen that there has been provided a dispensing closure comprises a plastic closure having a base wall with an opening therethrough and a peripheral skirt having means such as threads for engaging a container. A compression molded liner is formed in situ in the closure and includes a radial liner forming portion on the inner surface of the base wall of the closure. An integral nozzle is compression molded with the liner and extends axially through the opening in the base wall. One or more slits in the nozzle define a dispensing opening through which the contents of the container can be dispensed by squeezing the container. The invention is also applicable to making a closure for a package wherein a syringe needle is used to penetrate an elastomeric wall for removal of the liquid contents of the package.

The invention claimed is:

1. A method of making a dispensing closure comprising compression molding a first charge of molten plastic to form a plastic closure having a base wall and a peripheral skirt with internal means for securement to a container, and forming an opening in said base wall of said plastic closure, placing a second charge of molten plastic within said closure, and compression molding said second charge into a combined liner and nozzle on said plastic closure on an underside of said base wall within said skirt.

2. The method of making a dispensing closure set forth in claim 1 wherein the step of forming said opening in said base wall comprises forming an integral transverse cull on the base wall of the plastic closure during the compression molding of said plastic closure and thereafter severing said cull to form said opening.

3. The method of making a dispensing closure set forth in claim 2 wherein the step of forming said opening comprises forming a thin integral web of plastic connecting said cull to said base wall of said closure.

4. The method set forth in claim 2 wherein the step of forming said cull comprises forming a disk across said opening.

5. The method set forth in claim 4 wherein the step of forming said disk comprises forming a thin web of plastic at the juncture of said base wall and said disk along which said disk may be severed.

6. The method set forth in claim 2 wherein the step of forming said cull comprises forming a base wall and an integral wall integrally connected with said closure by a weakened line along which the cull is severed.

7. The method set forth in claim 6 including forming said closure to a configuration such that it can be utilized as an overcap.

8. The method of making a dispensing closure set forth in claim 1 including forming at least one slit in a nozzle portion of said combined liner and nozzle.

9. The method of making a dispensing closure set forth in claim 8 wherein the step of forming at least one slit in said nozzle portion comprises engaging said dispensing closure, applying a force to the outer surface of said nozzle portion and moving a cutting tool axially against the inner surface of said nozzle portion to cut said slit.

10. The method of making a dispensing closure set forth in claim 1 wherein the step of forming said combined liner and nozzle comprises forming a nozzle portion extending through said opening.

11. The method of making a dispensing closure set forth in claim 10 wherein the step of compression molding said plastic closure comprises forming an axial projection defining said opening, and wherein the step of said compression molding said combined liner and nozzle comprises engaging said axial projection to define a cavity for said nozzle portion during the compression molding.

12. The method of making a dispensing closure set forth in claim 11 wherein the step of compression molding of said plastic closure comprises forming a shoulder at the juncture of the inner surface of said base wall and said peripheral skirt, and engaging said shoulder with a forming tool to close the cavity during compression molding of the combined liner and nozzle.

13. A method of making a closure comprising
   molding a first charge of molten plastic to form a plastic closure having a base wall and a peripheral skirt with internal means for securement to a container, and forming an opening in said base wall of said plastic closure,
   placing a second charge of molten plastic within said closure, and
   compression molding said second charge into a combined liner and nozzle on said plastic closure on an underside of said base wall within said skirt.

14. The method set forth in claim 13 wherein the step of forming said opening in said base wall comprises forming an integral transverse cull on the base wall of the plastic closure during the molding of said plastic closure and thereafter severing said cull to form said opening.

15. The method set forth in claim 14 wherein the step of forming said opening comprises forming a thin integral web of plastic connecting said cull to said base wall of said closure.

16. The method set forth in claim 13 wherein the step of molding said plastic closure comprises forming an axial projection defining said opening, and thereafter compression molding said combined liner and nozzle by engaging said axial projection to define a cavity for said combined liner and nozzle during the compression molding.

17. The method set forth in claim 16 wherein the step of molding of said plastic closure comprises forming a shoulder at the juncture of the inner surface of said base wall and said peripheral skirt, and engaging said shoulder with a forming tool to close the cavity during the molding of the combined liner and nozzle.

18. The method set forth in claim 14 wherein the step of forming said cull comprises forming a disk across said opening.

19. The method set forth in claim 18 wherein the step of forming said disk comprises forming a thin web of plastic at the juncture of said base wall and disk along which the disk may be severed.

20. The method set forth in claim 14 wherein the step of forming said cull comprises forming a base wall and an integral wall integrally connected with said closure by a weakened line along which the cull is severed.

21. The method set forth in claim 20 including forming said closure to a configuration such that it can be utilized as an overcap.

22. The method set forth in claim 13 including forming at least one slit in said combined liner and nozzle.

23. The method set forth in claim 13 wherein said closure is molded by compression molding.

24. A method of making a closure comprising
   forming a plastic closure having a base wall, a peripheral skirt with internal means for securement to a container and an opening in said base wall,
   placing a mold charge of molten plastic material within said closure, and
   compression molding said mold charge into a combined liner and nozzle onto an underside of said base wall within said skirt in such a way that said combined liner and nozzle has an annular liner portion on said underside of said base wall and a nozzle portion within said opening.

25. The method set forth in claim 24 wherein the step of compression molding said combined liner and nozzle is such that said nozzle portion extends through said opening of said base wall.

26. The method set forth in claim 24 wherein the step of forming said plastic closure comprises forming an axial projection defining said opening, and thereafter compression molding said combined liner and nozzle by engaging said axial projection to define a cavity for said combined liner and nozzle during the compression molding.

27. The method set forth in claim 25 wherein the step of forming said plastic closure comprises forming a shoulder at the juncture of the inner surface of said base wall and said peripheral skirt, and engaging said shoulder with a forming tool to close the cavity during the molding of the combined liner and nozzle.

28. The method set forth in claim 24 wherein said closure is formed by compression molding.

* * * * *